United States Patent [19]
Bassett

[11] 3,935,777
[45] Feb. 3, 1976

[54] PORTABLE CUTTING DEVICE

[76] Inventor: Alvin Lee Bassett, 3414 Renick St., St. Joseph, Mo. 64507

[22] Filed: June 13, 1974

[21] Appl. No.: 478,934

[52] U.S. Cl. ............... 83/471.3; 83/477.1; 83/478; 83/486.1; 83/701
[51] Int. Cl.² .......................................... B27B 9/04
[58] Field of Search ....... 83/478, 471.2, 471.3, 472, 83/473, 477.1, 486.1, 614, 701; 269/290

[56] References Cited
UNITED STATES PATENTS

| | | | |
|---|---|---|---|
| 2,739,624 | 3/1956 | Haddock | 83/486.1 X |
| 2,941,554 | 6/1960 | Long | 83/486.1 X |
| 3,645,307 | 2/1972 | Stocker | 83/471.3 X |
| 3,730,042 | 5/1973 | Price | 83/471.3 |
| 3,827,326 | 8/1974 | Martin | 83/471.2 X |

*Primary Examiner*—Frank T. Yost
*Attorney, Agent, or Firm*—Fidelman, Wolffe & Leitner

[57] ABSTRACT

A portable cutting device is provided which comprises a table having first and second frame sections maintained in parallel spaced apart relationship by a plurality of attaching members extending between said first frame section and said second frame section, each of said first and said second frame sections having a longitudinally extending assembly mounted along an upper edge thereof, said longitudinal assemblies having a plurality of spaced apart transverse assemblies mounted thereon and extending substantially perpendicularly therebetween; guide means having a length sufficient to traverse a diagonal of said table and having sufficient rigidity to resist bending under stress and cutting means coacting with said guide to permit said cutting means to transverse a substantial portion of the length of said guide.

32 Claims, 20 Drawing Figures

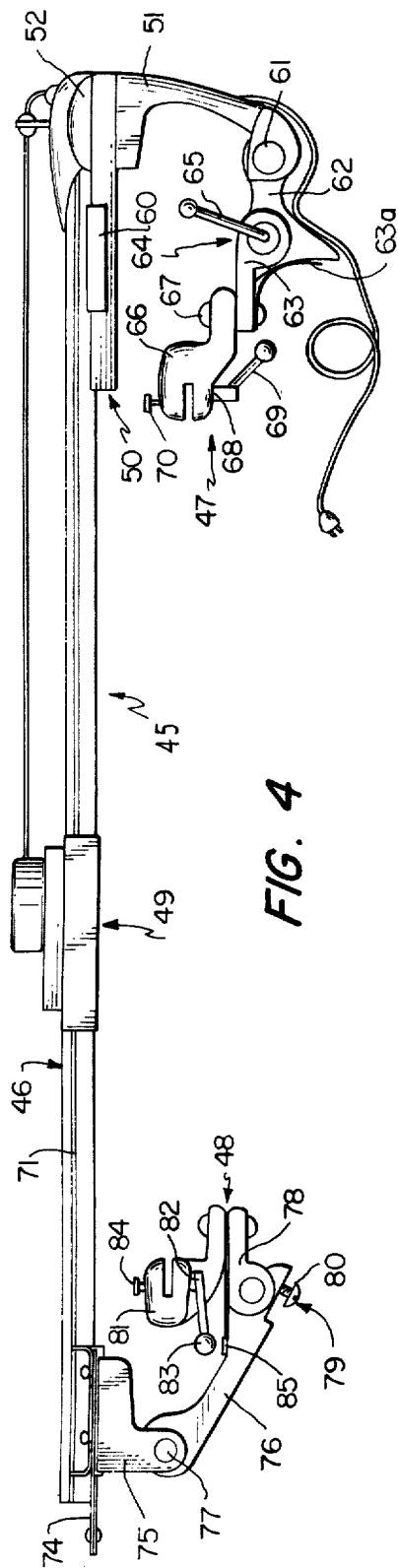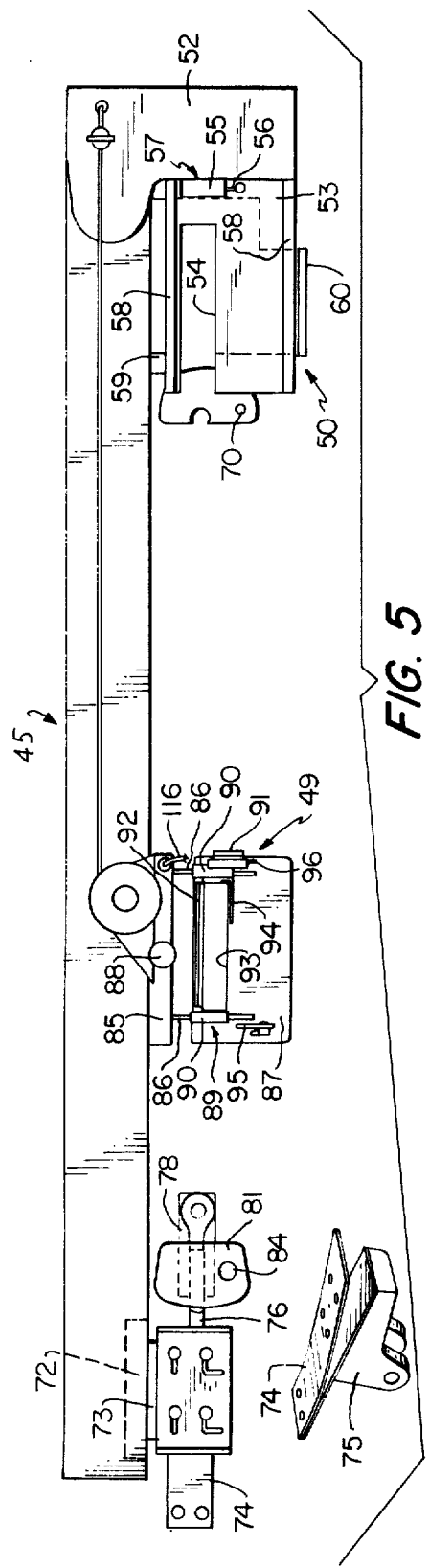

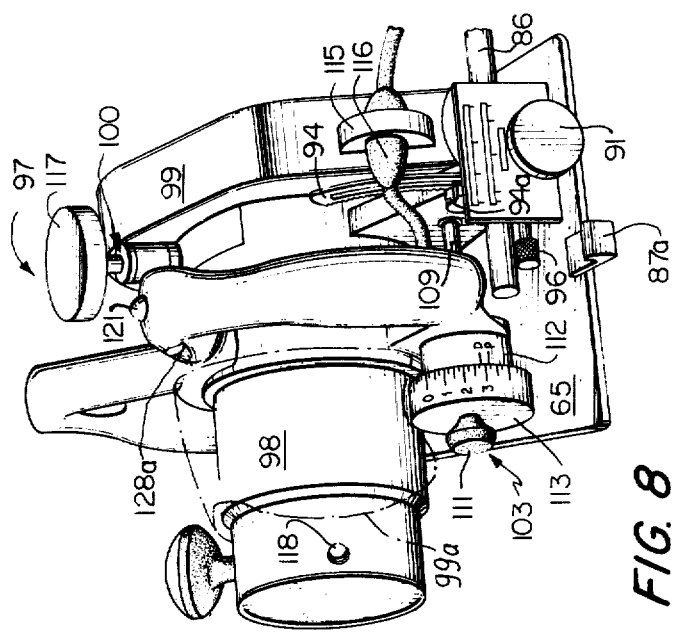
FIG. 8
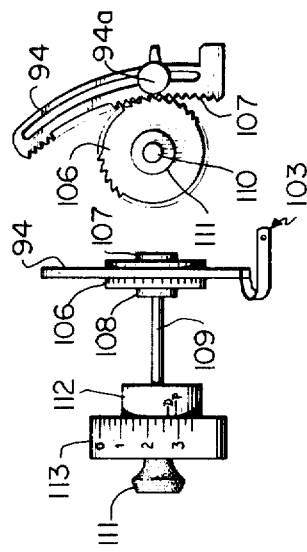
FIG. 8A
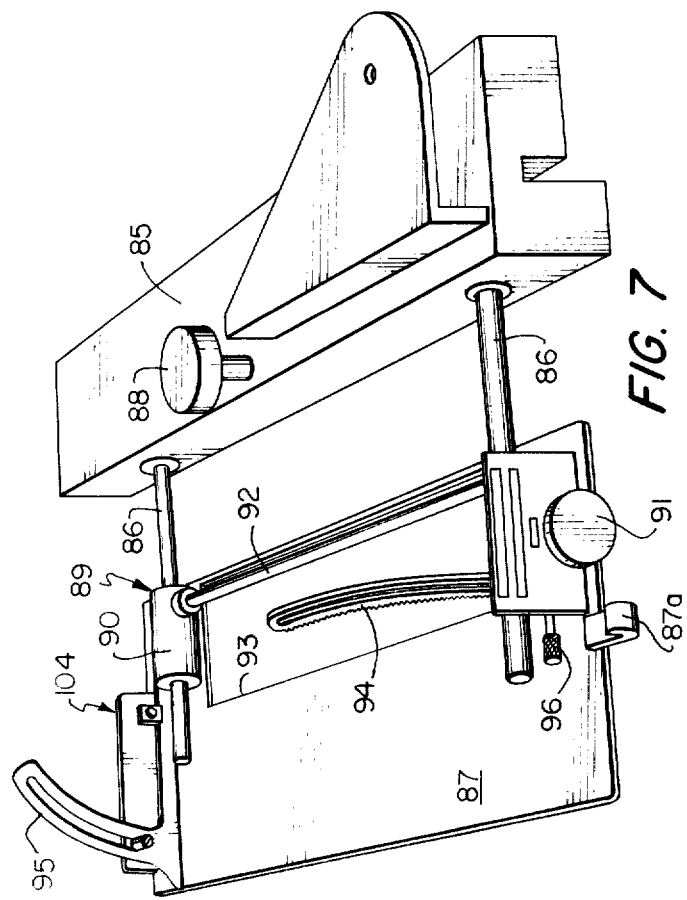
FIG. 7
FIG. 9

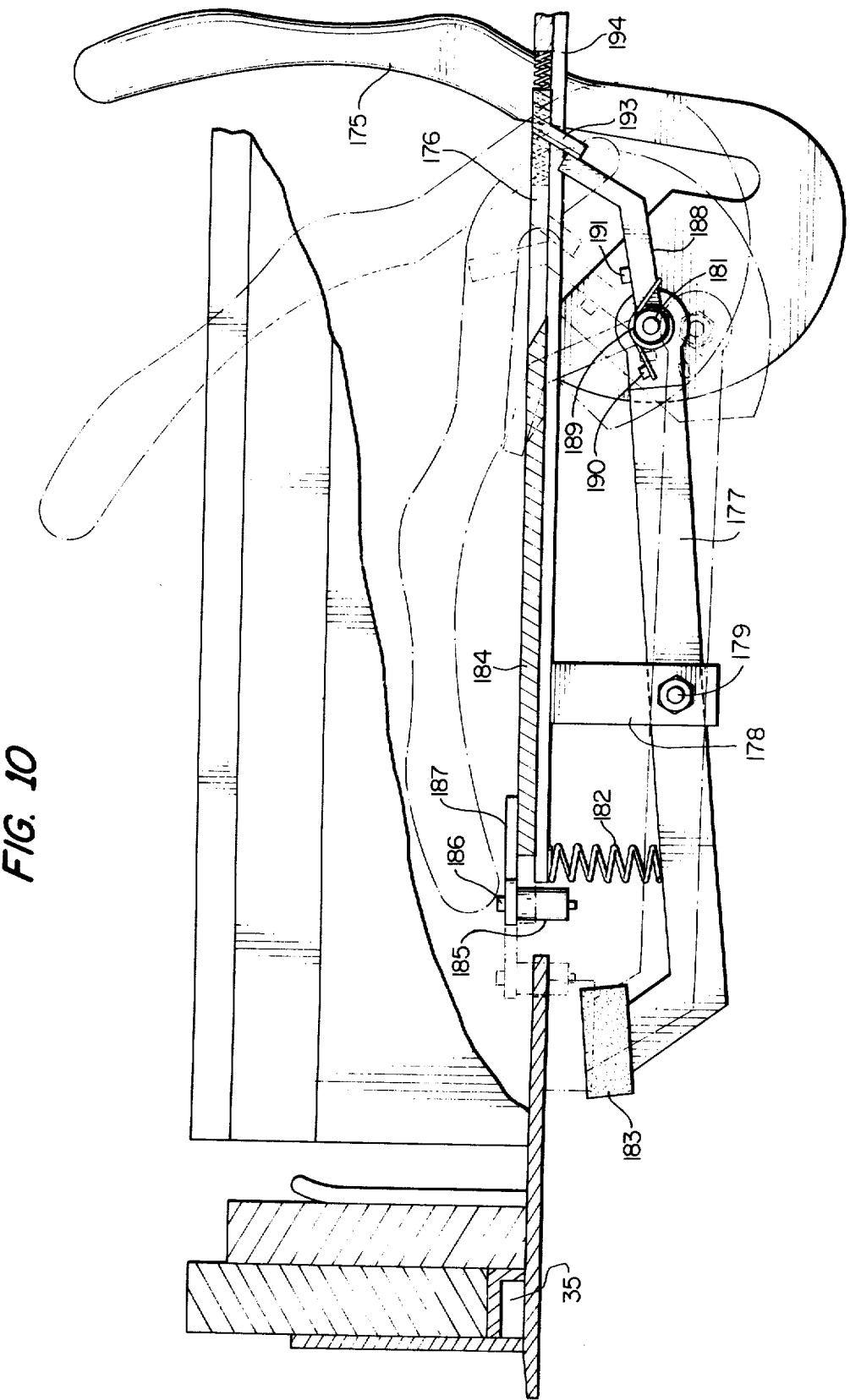

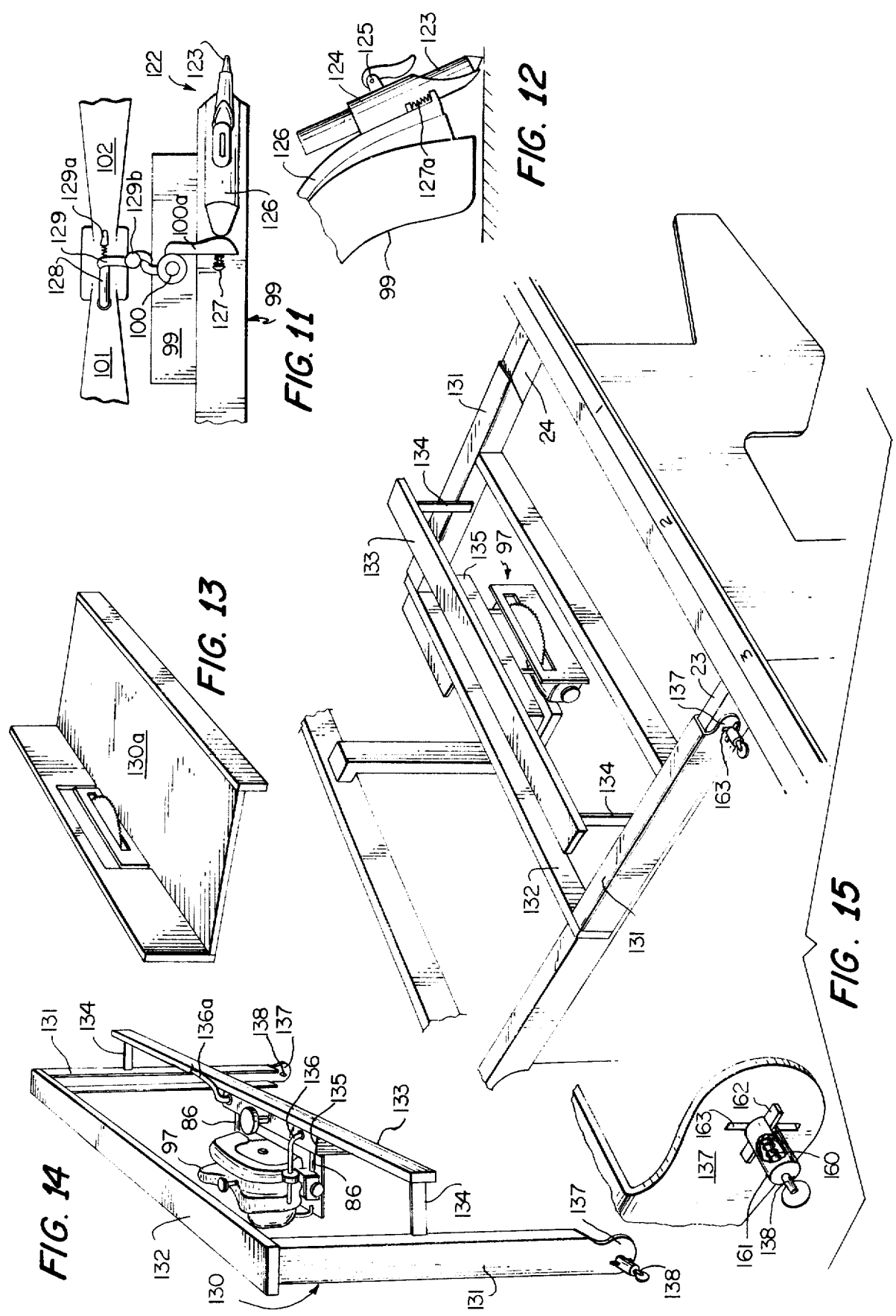

PORTABLE CUTTING DEVICE

BACKGROUND OF THE INVENTION

This invention relates to improvements in portable sawing machines in which portable motor driven circular saws are used, and includes means for so mounting the power driven saw unit with relation to work holding means that a wide variety of transverse, longitudinal and miter cuts may be cut in the work with great precision, accuracy, speed, and efficiency while assuring maximum safety.

Additionally, this invention relates to portable electric saw supports, and it has particular reference to adjustable tables for electric hand-type saws. A specific advantage of this invention resides in the provision of a portable table having means thereon for operatively supporting a portable hand-type electric saw assembly for transverse, longitudinal and mitering operations and affording a convenient device by which the saw can be readily and easily installed or removed at will and without altering the same to impair its usefulness in the usual operations.

With the advent of power driven hand held circular saws it became apparent to those acquainted with their use that it would be beneficial to provide a means for guiding the saw through the work by mechanical means. Further, it would be most advantageous to guide the saw through the work at various angles relative to the work and relative to the cutting means to obtain many different types of cuts including longitudinal, transverse, angular, and miter.

Portable power saws are in wide use today in the construction field by both the professional carpenter and the average homeowner. In both areas of use, such saws have proven to be a convenient and effective means for sizing and mitering construction materials. It is necessary, however, in the use of such saws, that an adequate support for the construction material, as well as guide means for the saw, be available. Carpenters, for example, measure studding and sheeting as necessary at the job site and mark the desired length or angle on the material to be cut. A portable electric saw is then manually manipulated to cut the material. The carpenter must improvise his support and guide means such as by setting up wooden horses under the work material and using a piece of scrap to guide the saw along its line of cut. This procedure often results in uneven, inaccurate and ragged cuts.

Further, where a flat sheet of material such as thin plywood sheeting is desired to be cut, the inherent flexing properties thereof add to the difficulties of accurate sawing. Thin sheeting has a tendency to flap between the cutting surface and the saw blade, thus adding to the inaccuracy of the cut. The use of a conventional table saw to perform the desired on-the-job sawing of comstruction materials is most impractical due to the weight and the inconvenience of moving and locating such a tool, especially if the most convenient work location requires frequent changing or is of limited area. The use of such a table saw is expecially impractical to the average homeowner. Such a person often cannot afford nor utilize an expensive table saw. The saw combination of the instant invention is more versatile and performs better than other types of saws commonly in use today.

One further problem has developed in regard to the particular uses to which a power saw may be put. The user frequently must prepare construction materials having steepslope angles. Such pieces are needed in constructing gabletype roofs. The limits of the average table saw do not permit such cuts to be readily made, and improvising guide means to do such jobs is even more difficult than in so doing for average cutting. Accordingly, there has developed a need for a guide and support table for use with portable power saws that is lightweight, has the attribute of portability, and can easily be adapted for use in making different slope cuts on construction materials.

OBJECTS OF THE INVENTION

A principal object of the instant invention is to provide a portable device by which virtually all sawing operations can be performed by those engaged in the building and woodworking arts, such as carpenters, cabinet makers, and the like, while providing for the use of the saw in the usual manner for cutting operations normally performed manually at different locations.

A further object of the instant invention is to provide a guide rail for an electric hand-type saw which will enable the saw to be moved freely and accurately in a predetermined direction, and which will hold the saw securely during the sawing operation and which will allow the user to remove the saw unit from its attached position easily and quickly when desired.

An additional object of the instant invention is to provide a saw table to firmly support the workpiece to be cut and provide a means to secure the saw unit and a guide means thereto.

Another object of the instant invention is to provide the saw table and guide rail with coacting indexing means which insure the horizontal disposition and accuracy of the cutting means for transverse, longitudinal, angular and miter cuts.

A further object of the instant invention is to provide a saw table which provides vertical adjustments by which materials of different thicknesses may be accurately cut.

Still another object of the instant invention is to provide a cradle for a circular saw which enables the cutting means to be disposed vertically or angularly and can be used in conjunction with a guide rail indexing means to effect angular cuts of a work piece secured by the saw table.

Yet another object of the instant invention is to provide a saw table which can secure various sizes of material up to and including approximately 4 ft. × 12 ft. sheets of substantially planar material.

A further object of the instant invention is to provide a saw table, guide rail and power saw combination which can be dismantled easily and quickly, transported manually to another location and quickly and easily reassembled to provide a sturdy portable device for sawing operations.

DESCRIPTION OF THE DRAWINGS

The foregoing and other advantages of the invention will become apparent from the ensuing disclosure in which a preferred embodiment of the invention is described in detail and illustrated in the accompanying drawings. It is contemplated that minor variations in structural features and arrangement of parts thereof may occur to the skilled artisan without departing from the scope of sacrificing any of the advantages of the invention.

IN THE DRAWINGS

Figure 6:
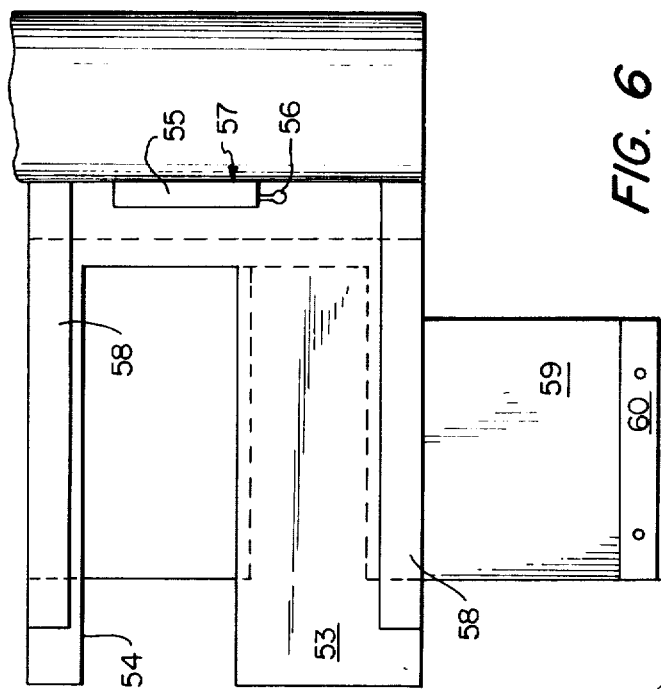
Figure 1:
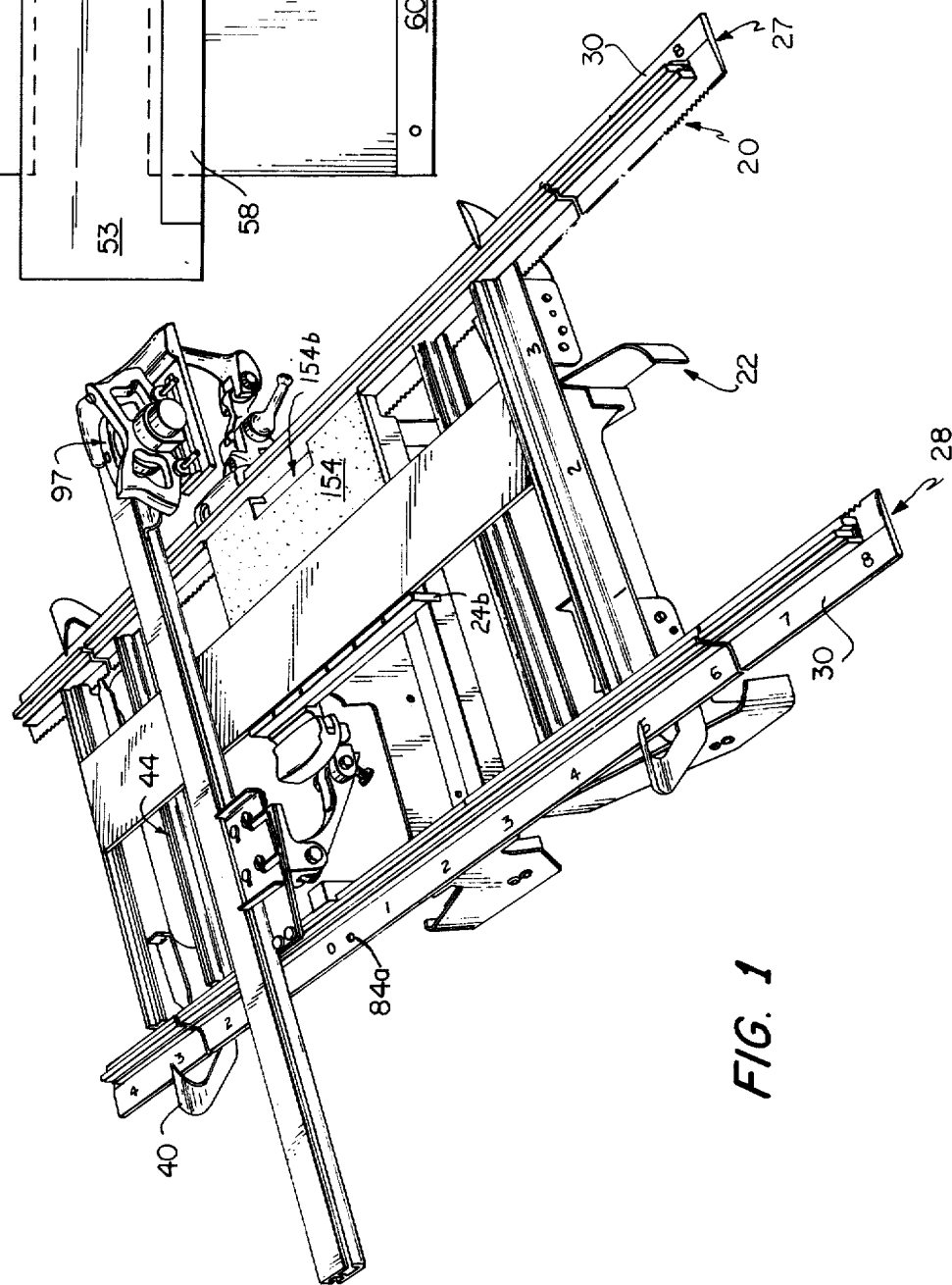
Figure 2:
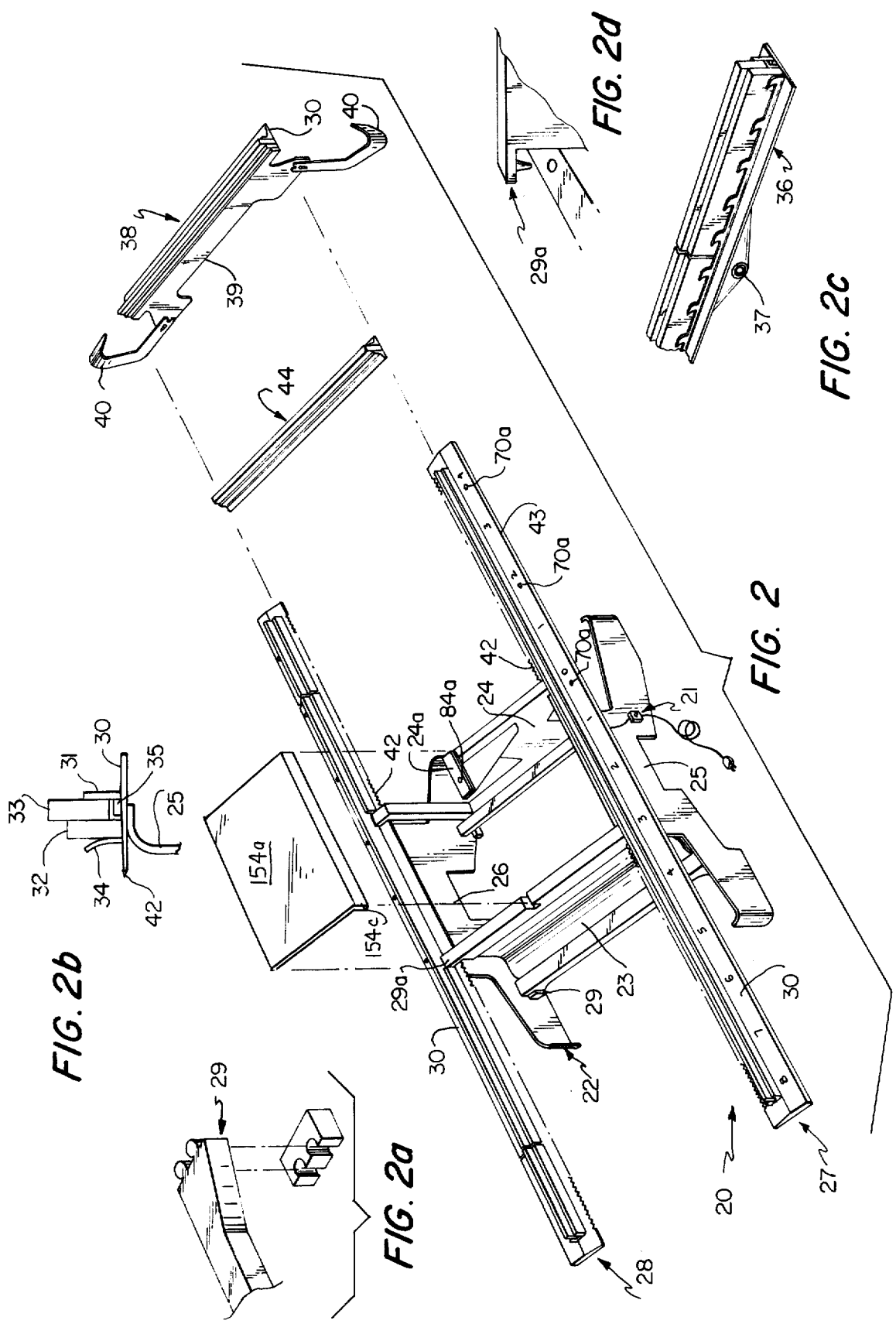
Figure 3:
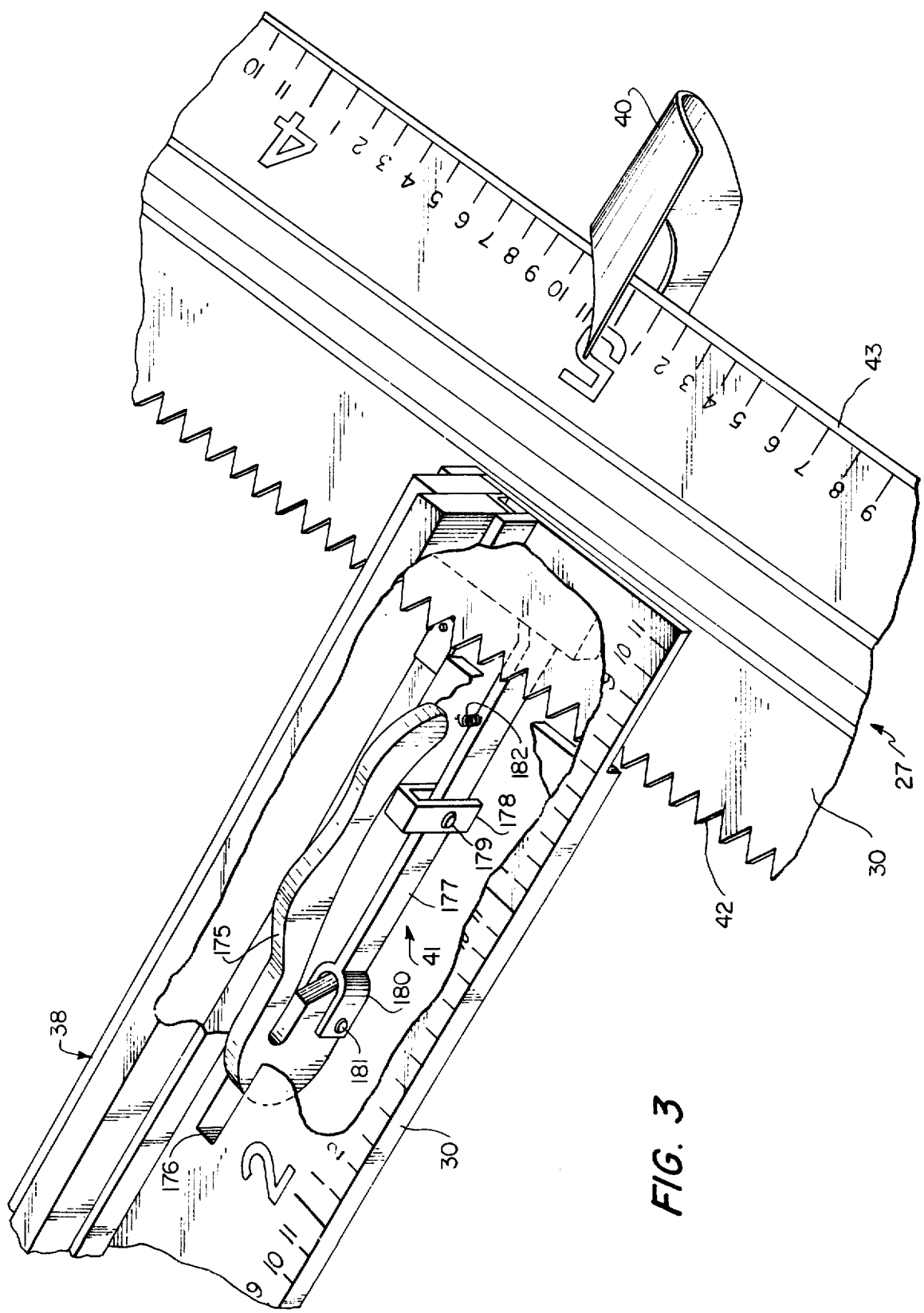

FIG. 1 is a perspective view of the apparatus of the instant invention completely assembled illustrating the saw table, the saw guide rail and the circular-type saw set up for a transverse cut of a workpiece less than one-half the width of the saw table;

FIG. 2 is an exploded perspective view of the saw table showing a movable transverse assembly and a movable transverse support;

FIG. 2a is an exploded view of a lower releaseable joint;

FIG. 2b is an end view of the perimeter assemblies;

FIG. 2c is a perspective view of a hinged section of a perimeter assembly;

FIG. 2d is an exploded view of an upper releaseable joint;

FIG. 3 is a fragmentary enlarged view of a perimeter assembly and a transverse fence showing detent assembly;

FIG. 4 is a side view of the guide rail and clamp assemblies;

FIG. 5 is a top view of the guide rail and clamp assemblies;

FIG. 6 is a top view of the saw cradle;

FIG. 7 is a perspective view of the saw carriage and support bar assembly;

FIG. 8 is a perspective view of the power saw;

FIG. 8A is a view of the front mounting means;

FIG. 9 is a side view of the power saw;

FIG. 10 is a side view of the detent assembly and end view of the perimeter assembly of FIG. 3;

FIG. 11 is a top view of the marking device;

FIG. 12 is a side view of the marking device;

FIG. 13 is a perspective view of the adapter frame and work support surface for grooving;

FIG. 14 is a perspective view of the grooving and shaping assembly attachment; and FIG. 15 is an exploded view of the indexing pin assembly used on the saw table with the grooving and shaping assembly.

DETAILED DESCRIPTION OF THE PREFERRED EMBODIMENT

A perspective view of the power saw table 20 of the instant invention constructed in accordance therewith is shown in FIGS. 1 and 2.

The table 20 includes a front frame 21, rear frame 22 and left and right attaching members 23 and 24.

The frames have generally planar vertical support members 25 and 26 and longitudinally extending assemblies 27 and 28 secured thereto.

The front frame 21 and rear frame 22 are rigidly maintained in a parallel spaced relationship by the attaching members 23 and 24 through lower releaseable joints 29 and upper releaseable joints 29a. The releaseable joints may be of any suitable type but there is shown by way of example in FIG. 2a, wedge-type joints having double wedging male and female members and in FIG. 2d a frustoconical pin and aperture arrangement. Attaching members 23 and 24 are provided with notches at their midpoint to contain a removable retaining fence 24b (FIG. 2).

The assemblies 27 and 28 include a plate 30, a retainer 31 perpendicularly secured to plate 30, an inner support 32 and an outer fence 33 juxtaposed and forced against retainer 31 by a biasing means 34. The top surface of the inner support is below the top surface of the outer fence. A riser 35 may be used to elevate the outer fence and conceal a power cord. The support assemblies may include sections 36 pivotally mounted by a locking hinge arrangement 37. The plate 30 has an inner serrated edge to provide positive indexing with two transverse perimeter assemblies 38 (FIG. 2).

The concealed power cord connects to three electrical outlets conveniently spaced on the bottom of plate 30. Front frame 21 is provided with an extension cord, junction box, an on-off switch, and a lead to the concealed cord. Attaching member 23 is provided with a cord having connections at either end to connect concealed cord housed in front frame 21 and rear frame 22.

Transverse perimeter movable assemblies 38 include perimeter assemblies similar to 27 and 28 and additionally include a downwardly projecting perpendicular element 39. Pivotally mounted at each end of element 39 are pointers 40 which can be secured in a horizontal position to cooperate with indicia 43, on the outer surface of plate 30 on perimeter assemblies 27 and 28. The movable assemblies 38 have a detent assembly 41 (FIG. 3) mounted on the underside of plate 30 on each end, which may selectively engage the inner serrated edge 42 of plate 30 on the perimeter assemblies 27 and 28.

The bottom surface of the transverse perimeter assembly 38 is supported on the inner top surface of plate 30 on the perimeter assembly at each end. Movable transverse supports 44 may extend between and be supported by the inner top surface of plate 30 of the perimeter assemblies 27 and 28.

The table 20 as described supports and cooperates with a rail and saw assembly 45 (FIGS. 1, 4 and 5), which includes a rail 46, and a fixed clamp assembly 47, a movable clamp assembly 48, a saw carriage 49 and a saw cradle 50.

The saw cradle 50 is fixed to the rail 46 at one end thereof and includes a downwardly extending arm 51 that pivotally supports fixed clamp assembly 47, and a laterally projecting arm 52. The cradle 50 further includes a cradle plate 53 projecting from said arm 52 and extending partially along the undersurface of rail 46. The cradle plate 53 includes a slot 54 extending generally parallel to the rail 46 and open at the end of the plate 53 away from the lateral arm 52. A latch 57 is provided at the end of the plate 53 near the arm 52. The latch 57 may include a retaining slot 55 and a retaining pin 56 which cooperate with catch 87a (FIG. 7). A pair of channels 58 are provided at the edge of the plate on both sides of said slot and parallel thereto. A reference plate 59, having a handle 60 is slidably mounted against the top surface of the cradle plate 53 by suitable means (not shown) such that the plate 59 may be reciprocated laterally to selectively project across the open slot 54.

The fixed clamp assembly 47 is pivotally secured to the end of arm 51 by a yoke and pin connection 61 as seen in FIGS. 1 and 4. The pin of the yoke assembly passes through a hole in fixed clamp connecting arm 62. An extension 63 is pivotally mounted to the connecting arm 62 by means of a compression lock joint 64 having an actuating handle 65 and a biasing means 63a which maintains 45 in the horizontal position. A clamp member 66 is pivotally mounted by means of a pin 67, on extension 63. Clamp 66 is generally "C" shaped and is provided with a compression lock 68 having an actuating handle 69. A lock pin 70 is provided on the upper branch of the C-clamp 66 and projects into the open portion of said C-clamp. Lock pin 70 is downwardly biased and indexes in aperatures 70a on the outer edge of plate 30 (FIG. 2).

The rail 46 is of a sufficient length to traverse the diagonal of the supporting table 20. Further, rail 46 has sufficient rigidity to minimize deflection under stress.

Rail 46 is provided with a track 71 extending along its entire length. A movable clamp support bar 72 is slidably mounted in track 71. Bar 72 includes a lateral tab 73 having a means for releaseably engaging a flex-plate 74. The releaseable connection between the lateral tab 73 and the flex-plate 74 may include cooperating slots and pins as shown in detail in FIG. 5. Flex-plate 74 is attached to a yoke 75. Yoke 75 is pivotally mounted on an arm 76 by pin 77. Pivotally attached to the opposite end of arm 76 is yoke 78. An adjustment means 79 is provided for controlling the degree of pivotal movement of arm 76 relative to yoke 78. Said adjustment may be accomplished by means of a screw 80 and a biasing means 85. A C-shaped clamp 81 is pivotally mounted on yoke 78, and includes a compression lock 82 having an actuating handle 83 and a lock pin 84 through the upper branch of C-clamp 81. Lock pin 84 is downwardly biased and indexes in apertures 84a on the outer surface of plate 30 and tab 24a (FIGS. 2, 4 and 5).

The saw carriage 49 includes a carriage support bar 85 which is slidably mounted in track 71 and partially concealed therein intermediate the clamp assemblies 47 and 48 (FIG. 5). A pair of spaced support rods 86 adjustably secure a saw carriage base plate 87 to travel bar 85. The support rods 86 project laterally from the travel bar 85 and are releaseably held in position by a locking mechanism, not shown, having a release knob 88. The base plate 87 is provided with an adjustable mounting assembly 89 which receives the support rods 86.

The adjustable mounting assembly 89 includes a pair of spaced collars 90, (FIGS. 5 and 7), that houses gears which may be simultaneously driven by rotation of a coarse control dial 91, a fine adjustment knob 96, and a coupling shaft 92.

The saw carriage base plate 87 includes a rectangular aperture 93 with its long side substantially parallel to the longitudinal axis of rail 46. A fixed arcuate bracket 95 and a pivotal arcuate bracket 94 are perpendicularly attached to saw base plate 87 and extend upwardly to provide adjustable means for mounting a saw 97 in a manner to be described.

The circular-type saw 97 (FIGS. 8 and 9) includes a main housing 98, a saw blade guard 99, a deflector shield 99a, a securing means 100 for said saw blade guard, a primary handle 101 having a non-zero indicator light 121 thereon, a secondary handle 102, front mounting means 103 (FIGS. 8, 8a and 9) and rear mounting means 104. The rear mounting means 104 cooperates with an arcuate slot in the fixed bracket 95 and includes an actuating handle 105 to selectively allow movement of the mounting means along the slot. The handle may be rotated to provide a compressional binding action to hold the bracket at any desired location along the slot. As the position of the rear mounting is varied along the bracket 95, the saw will pivot about the pivot point of the front bracket 94 at the junction of bracket 94 and base plate 87. Front mounting means 103 cooperates with an arcuate slot in bracket 94 and includes an actuating handle 94a to lock mounting means along the slot (FIG. 8a).

The front mounting means 103 at its serrated edge includes, as best seen in FIGS. 7, 8a and 9, a gear wheel 106, an outer gear clutch plate 107, an inner gear clutch plate 108, a gear clutch tube 109, a clutch shaft 110, a locking clutch knob 111, a depth gauge indicator 112 and a fractional depth dial 113. Rotational movement of the fractional depth dial 113 will be transferred by the shaft 110 to the gear wheel 106. The teeth of the gear wheel 106 cooperate with teeth 107 on the inside surface of bracket 94 to produce pivotal motion of the saw 97 about a pivot point 114 (FIG. 9). Rotation of the locking clutch knob 111 will tighten the clutch plate 107 and 108 against the gear wheel 106. The depth gauge indicator 112 is provided with a reference mark "D" for dado or dimensional linear lumber cuts, and a reference mark "P" for plywood. The front adjustable mounting mechanism may be calibrated to accommodate blades of various diameter and to insure that the depth setting of the saw table remains constant. Actuating handle 94a may be used to lock front bracket 94.

The saw blade guard 99 is provided with a female electrical safety connector 115 which must be disconnected from a male safety connector 116 extending from the main housing 98, before the guard may be removed. The blade guard securing means includes a locking knob 117 for selectively releasing the guard 99 from the main housing 98.

Saw 97 may include a transparent chip deflector 99a that extends over housing 98 to blade guard 99.

An automatic shaft lock switch 118 is provided on the main housing 98 to facilitate changing of the saw blades (FIGS. 8 and 9).

A biased reel arrangement may be provided on the travel bar 85 to house an electric cord which is attached to and extends along rail 46 to arm 52 to an appropriate electrical outlet (FIGS. 4 and 5).

A marking device 122, such as that shown in FIGS. 11 and 12, may be used in conjunction with the saw unit. The marking device 122 is attached to the front section of the blade guard 99 and includes a marker 123 in line with the saw blade, a holder 124 for said marker, with a biased securing means 125, an adjustable support bracket 126 and a biasing means 127 (FIG. 11). Thumbpress button 128a forces shaft 128 against lever 129 and biasing means 129a. Lever 129 rotates at axis 192b and abuts lever 100a which rotates about axis 100 on blade guard 99. Biasing means 127 forces lever 100a against slidably mounted bracket 126.

The circular saw can also be used as a shaper, groover, through an auxiliary frame 130 (FIG. 14) which is releaseably mounted on saw table 20 by hinges 137 coacting with attaching members 23 and 24. The auxiliary frame section 130 is shown in FIG. 15 with the saw unit mounted horizontally, and includes a pair of parallel frame members 131 connected at their ends by a transverse member 132. Approximately midway between the ends of parallel frame members 131 is a transverse member 133 elevated by supports 134 from the plane defined by members 131 and 132.

The saw unit 97 is attached to elevated transverse member 133 through mounting bracket 135 and line cord 136, 136a which releaeably engages support rods 86 which fix the saw cutting means in a horizontal position. Auxiliary work support surface 130a is used in conjunction with the groover and shaper frame and fits onto table 20 with support surface 130a between parallel and coplanar with frame members 131.

Parallel frame members 131 include hingers 137 which provide a means to secure frame section 130 to the saw table 20 on left attaching member 23 and right attaching member 24. Hinges 137 include a biased pin 138 with an indexing means to enable the frame to be locked in the vertical position.

FIG. 15 shows hinge 137 having a biasing means 160, and a pin 138 in a housing 161. Pin 138 has outward projections 162 which index in slot 163 provided on left and right attaching members 23a and 24 of table 20 to lock frame 130 in the vertical position.

FIG. 3 is a fragmentary enlarged view of a perimeter assembly and a transverse fence including the detent asssmbly 41.

The movable assemblies 38 have a detent assembly 41 (FIGS. 3 and 10) mounted on the underside of plate 30 on each end, which may selectively engage the inner serrated edge 42 of plate 30 on the perimeter assemblies 27 and 28. The bottom surface of the transverse perimeter assembly 38 is supported on the inner top surface of plate 30 of the perimeter assembly at each end.

Detent assembly 41 includes an actuating handle 175 extending through aperture 176 in plate 30 and rotatably mounted at 181 coaxially with yolk 180 of lever 177. Lever 177 secured to bracket 178 pivots at 179. Lever 177 further includes a biasing means 182 and resilient member 183. Detent pin 184 having downwardly projecting tab 193 is slidably mounted on the top surface of plate 30, within riser 35 and has a biasing means 194. Plate 187 mounted on detent pin 184 includes cylinder 185 vertically disposed and freely rotatable on shaft 186. Angular arm 188, having shoulder 191 is rotatably secured at 181 and is coaxial with biasing means 189 anchored at 190 to abut downwardly projecting fixed tab 193 of detent pin 184. Aperture 192 in detent pin 184 is aligned with aperture 176 in plate 30 such that angular arm 188 can pass therethrough.

Operation

The saw table is easily assembled by securing the front frame 21, and rear frame 22 through attaching members 23 and 24. The front frame 21 and rear frame 22 are rigidly maintained in a parallel spaced relationship by the attaching member 23 and 24 through releaseable joints 29 and 29a. The releaseable joints may be of any suitable type but there is shown by way of example in FIGS. 2a and 2d, wedge-type joints having double wedging male and female members and a frustoconical pin and aperture arrangement.

Sections 36 of the perimeter support assemblies 27 and 28 are extended and locked in a horizontal position by locking hinge assembly 37.

Movable transverse supports 44 are placed in the desired position extending between and supported by the inner top surface of plate 30 at each end of the perimeter assemblies 27 and 28.

Movable transverse perimeter assemblies 38 are then placed in position also extending between and supported by the inner top surface of plate 30 at each end of the perimeter assemblies 27 and 28. A planar sheet of material to be cut is placed on the saw table, for example a 4 foot by 8 foot sheet of plywood, such that the outer edge is supported by inner support 32 and retained by outer fence 33 of the perimeter assemblies, both made of replaceable material which will not damage a saw cutting means. Movable transverse supports 44 support the underside of the work material and are placed where needed within the perimeter of the edge of the workpiece to maintain the workpiece in a horizontal disposition. Support fences 38 are adjusted, and pointers 40 are secured in a horizontal position to cooperate with indicia 43 on the outer surface of plate 30 on perimeter assemblies 27 and 28 for measuring. The transverse support fences 38 are then secured in position by detent assembly 41 mounted on the underside of the support fence plates on each end of each fence 38 which selectively engages the inner serrated edge 42 of plate 30 on the perimeter assemblies 27 and 28.

When actuating handle 175 of detent assembly 41 is in the vertical position biasing means 182 disengages resilient member 183 from the bottom surface of plate 30. Angular arm 188 having shoulder 191 is urged against downwardly projecting fixed arm 193 of detent pin 184 by biasing means 189 thereby withdrawing vertically disposed cylinder 185 from engagement with serrated edge 42.

When actuating handle 175 is in the 45° position after pointer 40 is placed in alignment with indicia 43, biasing means 182 maintains resilient member 183 from locking the under side of plate 30. Angular arm 188 is forced through aligned aperture 176 in plate 30 and aperture 192 in detent pin 184 by handle 175 thereby allowing detent pin biasing means 194 to urge detent pin 184 into engagement with serrated edge 42. In this position an impact on a movable support fence 38 would only cause the detent assembly 41 to skip serrations without damage to the assembly.

When actuating handle 175 is placed in the horizontal position lever 177 rotates around axis 179 to compress biasing means 182 and force resilient member 183 into contact with the underside of plate 30 thereby securing transverse movable assemblies 38 relative to the perimeter assemblies 27 and 28.

Simultaneously, actuating handle 175 abuts angular arm 188 urging it forward to permit handle 175 to assume a horizontal position without interference from angular arm 188. As above, detent pin 184, and biasing means 194 act to maintain vertically disposed cylinder 185 in engagement with serrated edge 42.

The rail and saw assembly 45 is attached to the saw table 20 by fixed clamp assembly 47 and movable clamp assembly 48. Each of the clamps may be placed at any point on the perimeter of the saw table, since the rail 46 is long enough to extend across the saw table transversely, longitudinally or diagonally depending on the desired cut. Each clamp can be adjusted to provide lateral or vertical motion depending on the type of cut required.

Flex plate 74 allows rail 46 to be raised at its opposite end where clamp 47 is released and work is to be inserted or removed from saw table 20. Additionally, one of the attaching members 24 is provided with a tab 24a at its midpoint to allow clamp 48 to be secured thereto. This allows the utilization of material equal to or less than one-half the width of the table. Further, flex plate 74 provides a pivot point outside the perimeter assemblies when clamp 47 is released and the saw rail 46 is elevated, while clamp 48 is secured to tab 24a.

The saw cradle 50 is fixed to the rail 46 at one end thereof and includes a downwardly extending arm 51 that pivotally supports fixed clamp assembly 47, and laterally projecting arm 52. The cradle plate 53 includes a slot 54 extending generally parallel to the rail 46 and open at the end of the plate 53 away from the lateral arm 52 through which slot the blade of the cutting means passes. Latch 57 provides a means to retain the cutting means 97 in the cradle 53. The channels 58 and the cradle plate 53 provide a means to slidably retain saw base plate 87 and cutting means 97 in the cradle plate.

Reference plate 59, having a handle 60, is slidably mounted against the upper surface of the cradle plate 53 such that the plate may be reciprocated laterally to selectively project across the open slot 54 to permit vertical adjustment of the saw blade using reference plate 59 as the zero point.

The clamps 47 and 48 are arranged to provide both horizontal and vertical movement and biased in such a way as to insure that the rail is in a parallel plane with the material being cut. Both clamps can be secured in a multitude of positions, through compression locks actuated by appropriate handles.

Saw Base Plate (Carriage)

Saw carriage 49 includes a carriage support bar 85 which is slidably mounted in track 71 and partially concealed therein intermediate the clamp assemblies 47 and 48. A saw carriage base plate 87 is adjustably secured to the carriage support bar 85 by spaced support rods 86. The circular-type saw 97 is adjustably mounted on saw carriage base plate 87. Through front mounting means 103 and rear mounting means 104 the circular type saw base plate and travel bar can then slide along track 71 in rail 46 to effect any desired cut. The circular-type saw 97 and base plate unit 87 are adjusted relative to the travel bar 85 and rail 46 by assembly 89 which is actuated by coarse control dial 91 through coupling shaft 92. Indicator light 121 remains off unless the coarse control dial 91 or fine control dial 96 place the saw in a non-zero position. The saw 97 is then turned on and guided along rail 46 to provide the desired cut, after the necessary adjustments have been made.

Circular-Type Saw Adjusting Means

Circular-type saw 97 is adjustably secured to saw carriage base plate 87 by front mounting means 103 and rear mounting means 104. The rear mounting means 104 cooperates with an arcuate slot such that as the position of the rear mounting is varied along bracket 95 the saw pivots about the pivot point of the front bracket 94.

The front mounting means 103 is adjusted through depth gauge indicator 112 and fractional depth dial 113. Rotational movement of the fractional depth dial 113 is transferred by shaft 110 to gear wheel 106 which cooperates with teeth 107 on bracket 94 to pivot saw 97 about pivot point 114. The depth gauge indicator 112 is provided with a reference mark "D" for dado and dimensional linear lumber cuts and a reference mark "P" for plywood cuts. The front adjustable mounting mechanism may be calibrated to accommodate blades of various diameter and to insure that the depth setting of the saw blade remains constant.

Marking Device

A marking device 122 is used in conjunction with the saw unit. Marker 123 is in line with the saw blade and can be made to contact the work by pressing button 128a which forces shaft 128 against lever 129 and biasing means 129a. Lever 129 rotates at axis 129b and abuts lever 100a which rotates about axis 100 on blade guard 99. Biasing means 127 forces lever 100a against slidably mounted bracket 125. It should be noted that the saw blade guard 99 may be removed since lever 129 and lever 100a are not connected.

Attaching members 23 and 24 are each provided with a notch at their midpoints to receive a retaining fence 24b to extend therebetween. A primary work surrport surface 154 which can be provided with a cut out portion 154b for a miter box may be placed across attaching members 23 and 24, retained at its fence longitudinal edges by perimeter assembly 27 and retaining fence 24b.

Retaining fence 24b may be removed and a secondary work support 154a surface can be inserted. Said secondary work support surface is provided with a downwardly projecting ridge 154c along its front edge. Said ridge is received in the notches on the upper surfaces of said attaching members and the rear edge of said secondary support surface will rest on the plate of the rear perimeter assembly to thus provide a continuous planar surface extending from the front perimeter assembly to the rear perimeter assembly for the purpose of supporting relatively thin plywood sheeting to prevent flexing and assure accurate sawing.

With retaining fence 24b and the work support surface 154 across attaching members 23 and 24 removed, auxiliary frame section 130 can be mounted to provide a groover and shaper attachment as shown in FIG. 15. The transverse frame member 132 of auxiliary frame 130 is received by the notches in attaching members 23 and 24 as in retaining fence 24b. When used for grooving and shaping, auxiliary work support surface 130a is used in conjunction with frame 130 (FIG. 15).

The foregoing constitutes a description of an improved table for use with a portable saw whose inventive concepts are believed set forth in the accompanying claims.

The principles, preferred embodiments, and modes of operation of the present invention have been described in the foregoing specification. The invention which is intended to be protected herein, however, is not to be construed as limited to the particular forms disclosed since these are to be regarded as illustrative rather than restrictive. Variations and changes may be made by those skilled in the art without departing from the spirit or scope of the present invention.

What is claimed is:

1. A portable cutting device comprising:
   a table having
   a. first and second frame sections maintained in parallel spaced apart relationship by a plurality of attaching members extending between said first frame section and said second frame section;
   b. each of said first and said second frame sections having a longitudinally extending assembly mounted along an upper edge thereof;
   c. said longitudinal assemblies having a plurality of spaced apart transverse assemblies slidably mounted thereon and extending substantially perpendicularly therebetween, a pair of longitudinal assemblies cooperate with a pair of transverse assemblies to define the perimeter of a quadrilateral which quadrilateral forms the perimeter of a working surface of said table;

guide means having a length sufficient to traverse a diagonal of said table and having sufficient rigidity to resist bending under stress; and cutting means coacting with said guide to permit said cutting means to traverse a substantial portion of the length of said guide.

2. The portable cutting device of claim 1 wherein each of said longitudinal assemblies and said transverse assemblies comprise a horizontal plate, an outer retainer perpendicularly secured to said plate, an outer fence and an inner support juxtaposed and forced against said retainer by a biasing means, wherein the upper surface of the inner fence is below the level of the upper surface of the outer fence.

3. The portable cutting device of claim 2 wherein the inner edge of the horizontal plate of each of said longitudinal assemblies is serrated to provide indexing with a transverse assembly.

4. The cutting device of claim 3 wherein each end of each transverse assembly is provided with a pivotally mounted pointer which can be raised and secured in a horizontal position so that said pointer cooperates with indicia on the outer edge of the horizontal plate of said longitudinal assembly or of said transverse assembly.

5. The cutting device of claim 3 wherein each transverse assembly is provided with at least one detent assembly which selectively engages the serrated inner edge of the longitudinal assembly thereby securing the transverse assembly to the longitudinal assembly.

6. The cutting device of claim 5 wherein said horizontal plate of each end of each transverse assembly is provided with a detent assembly which selectively engages the inner serrated edge of the horizontal plate of a longitudinal assembly to secure the transverse assembly to the horizontal assembly.

7. The cutting device of claim 6 wherein said detent assembly comprises a handle and a detent slidably mounted on the transverse assembly such that the detent can engage the serrated edge of the longitudinal perimeter assemblies.

8. The cutting device of claim 1 wherein a pair of transverse supports extend between and are substantially perpendicular to the longitudinal assemblies and wherein said transverse supports are disposed within the perimeter of said quadrilateral.

9. The portable cutting device of claim 8 wherein said transverse supports are supported by said longitudinal assemblies such that said transverse supports may be moved along the length of the longitudinal assemblies while maintaining their perpendicular relationship.

10. A portable cutting device comprising:
a table having
 a. first and second frame sections maintained in parallel spaced apart relationship by a plurality of attaching members extending between said first frame section and said second frame section;
 b. each of said first and said second frame sections having a longitudinally extending assembly mounted along an upper edge thereof;
 c. said longitudinal assemblies having a plurality of spaced apart transverse assemblies mounted thereon and extending substantially perpendicularly therebetween;
guide means having a length sufficient to traverse a diagonal of said table and having sufficient rigidity to resist bending under stress, said guide means includes a rail having a track extending substantially along the entire length of said rail, said rail is mounted on the table by attaching means, which means slidably engage an outer edge of the longitudinal or the transverse assemblies to permit lateral adjustment of the rail on the assemblies; and cutting means coacting with said guide to permit said cutting means to traverse a substantial portion of the length of said guide.

11. The portable cutting device of claim 10 wherein said attaching members are rigid and are releasably secured to said first frame section and said second frame section by means of quick disconnect joints.

12. The portable cutting device of claim 11 wherein said joints are wedge type joints.

13. The portable cutting device of claim 10 wherein said attaching means includes a first clamp assembly fixed at one end of said rail, and a second clamp assembly movable along the length of said rail.

14. The portable cutting device of claim 13 wherein said second clamp assembly is slidably mounted in said track.

15. The portable cutting device of claim 13 wherein at least one of said attaching members is provided with a surface intermediate said first and second frame sections to which said second clamp assembly may be secured.

16. A portable cutting device comprising:
a table having
 a. first and second frame sections maintained in parallel spaced apart relationship by a plurality of attaching members extending between said first frame section and said second frame section;
 b. each of said first and said second frame sections having a longitudinally extending assembly mounted along an upper edge thereof;
 c. said longitudinal assemblies having pivotally mounted sections provided with a locking arrangement such that said pivotal sections may be locked into position to selectively extend the length of said longitudinal assemblies;
 d. said longitudinal assemblies having a plurality of spaced apart transverse assemblies mounted thereon and extending substantially perpendicularly therebetween;
guide means having a length sufficient to traverse a diagonal of said table and having sufficient rigidity to resist bending under stress; and cutting means coacting with said guide to permit said cutting means to traverse a substantial portion of the length of said guide.

17. A portable cutting device comprising:
a table having
 a. first and second frame sections maintained in parallel spaced apart relationship by a plurality of attaching members extending between said first frame section and said second frame section, said attaching members include upper surfaces that are notched at their mid-points for receiving a removable retaining fence;
 b. each of said first and said second frame sections having a longitudinally extending assembly mounted along an upper edge thereof;
 c. said longitudinal assemblies having a plurality of spaced apart transverse assemblies mounted thereon and extending substantially perpendicularly therebetween;
guide means having a length sufficient to traverse a diagonal of said table and having sufficient rigidity to resist bending under stress; and cutting means coacting with said guide to permit said cutting means to traverse a substantial portion of the length of said guide.

18. The portable cutting device of claim 14 wherein a retaining fence is inserted in said notches and a primary work support surface is provided which extends between said retaining fence and said first longitudinal assembly.

19. The portable cutting device of claim 18 wherein said primary work support surface is cut out to provide means for receiving and positively locating a miter box.

20. The portable cutting device of claim 17 wherein a secondary work support surface is placed on said attaching members and retained by said notches at its front edge and extending to said second longitudinal assembly, and a primary work support surface is placed on said attaching members and extends between said secondary work support surface and said first longitudinal assembly to thus provide a continuous planer surface extending between said first and second longitudinal assemblies.

21. A portable cutting device comprising:
a table having knock-down frame sections forming a work supporting perimeter;
guide means having a length sufficient to traverse a diagonal of said table, said guide means having
  a. a rail having a track extending substantially along its entire length and,
  b. mounting assemblies slidably engaging said supporting perimeter, said mounting assemblies include a first clamp assembly fixed at one end of said rail and a second clamp assembly movable along the length of said rail, said first clamp assembly and said second clamp assembly having a plurality of pivotally connected members to allow said guide to be selectively positioned generally horizontally over the support perimeter; and
cutting means coacting with said guide to permit said cutting means to traverse a substantial portion of the length of said guide.

22. The portable cutting device of claim 21 wherein said first and said second clamp assemblies include adjustment means for controlling the relative vertical position of said guide relative to said perimeter.

23. The portable cutting device of claim 21 wherein said guide includes a laterally projecting fixed cradle adjacent said fixed clamp assembly positioned to support said cutting means when not performing a cutting operation.

24. The portable cutting device of claim 23 wherein a carriage member is slidably mounted in said track intermediate said first and said second clamp assemblies and extends laterally therefrom.

25. The portable cutting device of claim 24 wherein said carriage includes a base plate having a fixed arcuate bracket and a pivotal arcuate bracket for mounting said cutting means onto said carriage.

26. The portable cutting device of claim 25 wherein said cutting means includes a circular-type saw having a rotary blade, a housing provided with a front and a rear mounting means that cooperate with said fixed and said pivotal arcuate brackets to secure said saw to said carriage.

27. The portable cutting device of claim 26 wherein said rear mounting means on said saw is pivotally connected to said fixed arcuate bracket, said front mounting means on said saw is connected to said pivotal arcuate bracket.

28. The portable cutting device of claim 27 wherein said front mounting means includes a rotational gear mechanism and said rear mechanism includes a releasable compression means to provide vertical and angular adjustment of said saw relative to said base plate.

29. The portable cutting device of claim 28 wherein said saw cradle includes a cradle plate provided with a slot that receives said saw blade when said saw carriage is positioned over said saw cradle, and a reference plate slidabley mounted on the top surface of said cradle plate such that it may be selectively positioned across said slot to provide a reference surface for locating the bottom of said saw blade.

30. The portable cutting device of claim 26 wherein said saw includes a primary handle having an indicator light, a secondary handle, an actuating switch on each handle, a blade guard, and a transparent chip deflector attached to said blade guard.

31. The portable cutting device of claim 30 wherein said blade guard is removable and is provided with an electrical connection which must be disconnected before the guard may be removed.

32. The portable cutting device of claim 24 wherein said cradle is provided with a latch member and saw carriage is provided with a catch to releasably secure said carriage to said cradle.

* * * * *